Figure 1:
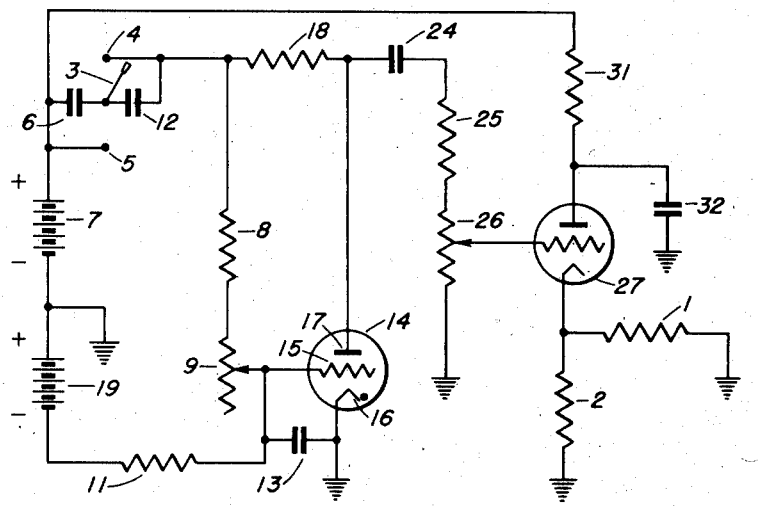

Oct. 6, 1953

L. R. SPAULDING 2,654,839

ELECTRIC PULSE GENERATOR

Filed Feb. 24, 1949

INVENTOR.
LYMAN R. SPAULDING
BY

UNITED STATES PATENT OFFICE 2,654,839

ELECTRIC PULSE GENERATOR

Lyman R. Spaulding, Portland, Oreg.

Application February 24, 1949, Serial No. 78,201

3 Claims. (Cl. 250—27)

(Granted under Title 35, U. S. Code (1952), sec. 266)

The invention described herein may be manufactured and used by or for the Government of the United States for governmental purposes without the payment to me of any royalty thereon in accordance with the provisions of the Act of April 30, 1928 (Ch. 460, 45 Stat. L. 467).

This invention relates to electrical testing circuits generally, but in particular to those producing electrical signals of prescribed form. The principal object of this invention is to produce an electrical circuit which will transmit a succession of controlled electrical pulses of extremely short duration. Another object is to produce, at will, pulses of variable voltage and variable time spacing. A third object is to produce said pulses in isolated pairs, that is, just two pulses at a time. What constitutes my present invention is described in the following specification in reference to the drawing and is succinctly defined in the appended claims.

Figure 4:
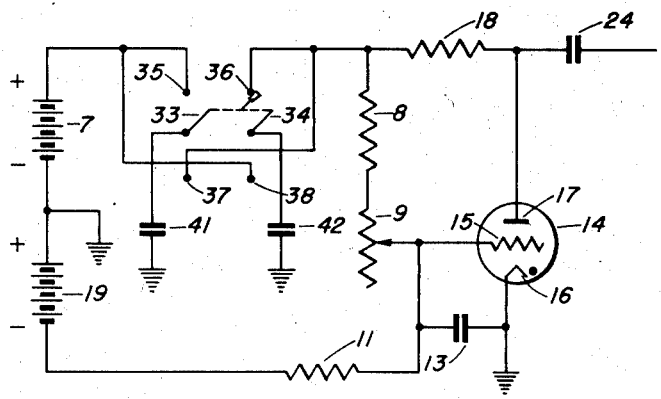
Figure 2:
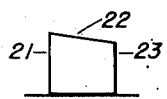
Figure 3:
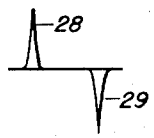

In the drawing, Figure 1 is a schematic circuit diagram. Figure 2 is an illustration of the wave form of the voltage in one part of the circuit during operation. Figure 3 is an illustration of the wave form of the pulses produced and transmitted by the circuit shown in Figure 1. Figure 4 is an arrangement alternative to part of Figure 1.

Referring to Figure 1 it is desired to impress a pair of electrical pulses as shown in Figure 3 across a load represented by a resistor 1, and another loading resistor 2. These pulses are produced at will by throwing, manually, a switch 3 from one contact 4 to a second contact 5.

Beginning with switch 3 on contact 4, a condenser 6 is charged by a battery 7 through a series of resistors 8, 9 and 11. When switch 3 is thrown from contact 4 to contact 5, condenser 6 becomes short-circuited and a second condenser 12 becomes charged by battery 7 in the same way as condenser 6 had been originally charged through resistors 8, 9, and 11.

In this arrangement, throwing switch 3 from 4 to 5 or vice versa causes a surge of current from battery 7 to flow until condenser 6 or condenser 12 becomes charged. During the time either condenser is being charged, current flows through resistors 8, 9, and 11, and into a condenser 13 connected to a gaseous triode 14 between the grid 15 and cathode 16 thereof. The voltage across condenser 13 and resistors 8 and 9 is impressed on the plate 17 of the triode 14 through a stabilizing resistor 18. The increasing voltage appearing across condenser 13 is impressed on grid 15.

The voltage of grid 15 is stabilized initially by a bias battery 19. When the positive surge of voltage developed across condenser 13 sufficiently opposes the bias voltage of battery 19, tube 14 becomes conductive permitting current to flow in the plate circuit through plate resistor 18. When switch 3 was thrown the voltage of battery 7 was impressed through condenser 6, for example, across resistors 8, 9, and 11 and thereby across resistor 18 and the plate 17 of tube 14. This voltage is indicated in Figure 2 by the height 21 of the voltage wave. As condenser 6 becomes charged the voltage impressed on plate 17 of tube 14 decreases exponentially as shown by the top 22 of the voltage wave. When tube 14 becomes conductive, the plate impedance becomes virtually zero, in effect short-circuiting resistors 8 and 9 and causing the voltage on the plate 17 to change to zero as indicated by 23 of the voltage wave in Figure 2.

Actually the voltage wave in Figure 2 is more nearly level across the top than shown in the drawing. The wave shape is not a critical factor because triode 14 becomes conductive before condenser 6 has become charged to an appreciable voltage. That is the current through resistors 8 and 9 remains practically constant until triode 14 has become conducting. This follows from the condition that triode 14 becomes conducting when the negative bias on grid 15 has been decreased by only a small amount. The voltage that decreases the bias is developed across condenser 13 when the charge therein has accumulated to as little as a few percent of the charge ultimately accumulated when condenser 6 and condenser 13 are at their resultant equalized voltages. This causes tube 14 to become conducting in a time following the operation of switch 3 that is short compared with the time that would be required to completely charge condenser 6 or 12 through resistors 8, 9, and 11.

By properly proportioning the values of the various resistors and the condensers in the circuit, the time between the beginning 21 and the end 23 of the wave shown in Figure 2 can be made to vary over a range of from a few microseconds to several seconds. Illustrative of a practical construction of the circuit for a wave as in Figure 2 of from about 10 to about 1,000 microseconds, the following values are appropriate: Condensers 6 and 12, 0.1 microfarad; resistors 8, 9, and 11, of the order of megohms; and condenser 13, 0.1 microfarad. Resistor 18 is not an essential part of the circuit but it is useful for stabilizing the operation of tube 14. With a given set of values of condensers and resistors, the length of the wave in Figure 2, is adjusted by variation of resistor 9.

The voltage wave as shown in Figure 2 is impressed on an ordinary triode 27 by condenser 24 and resistors 25 and 26 which act as a differentiating circuit. In one respect triode 27 accomplishes the function of matching the impedance between the high impedance circuit of condenser 24 and resistor 25 and 26, and the low impedance load resistance 1. When switch 3 is thrown current flows into condenser 24 until the condenser 24 is charged to the voltage impressed thereon by condensers 6 or 12. During the time condenser 24 is charging a current flows in resistors 25 and 26 producing in resistor 26 a voltage positive with respect to ground. Condenser 24 is small compared with condensers 6 and 12 so it becomes fully charged very quickly, thus stopping the flow of current in resistors 25 and 26. This momentary flow of current in these resistors produces a brief flow of current in triode 27 as indicated by the short pulse 28 in Figure 3.

The occurrence of pulse 28 is within a very short time after switch 3 is thrown from contacts 4 to 5 or vice versa. After condenser 24 is charged and pulse 28 is completed there is no further action in triode 27 until triode 14 becomes conducting. When this occurs, the resistance across triode 14 drops to a low value, practically zero, so condenser 24 discharges quickly through triode 14 producing a flow of current in resistors 25 and 26 opposite in polarity to that occuring when condenser 24 was being charged. This produces pulse 29 indicated in Figure 3.

The pulses 28 and 29 are illustrative of the currents that flow in resistor 26 and in triode 27. The two pulses 28 and 29 in resistor 2 are the result desired in the system. The spacing between pulses 28 and 29 is the same as between the beginning 21 and 23 of the flat topped wave 22 shown in Figure 2. Thus resistor 9 controls the spacing between pulses 28 and 29.

Triode 27 has for stabilization of performance a resistor 31 and a condenser 32.

Figure 4 shows an arrangement alternative to part of Figure 1. The basic principles of operation are the same, but whereas in Figure 1 a surge of voltage is produced on resistors 8 and 9 by charging a condenser 6 or 12, a surge is produced in Figure 4 by the discharge of a previously charged condenser 41 or 42.

In the operation of Figure 4, a gang operated pair of switches, single-pole, double-throw, 33 and 34, is thrown from their respective contacts 35 and 36 to a second pair of contacts 37 and 38, and vice versa. When switch 33 is in contact with 35, and switch 34 with contact 36, as shown in Figure 4, condenser 41 is charged, or being charged by battery 7 while condenser 42 is discharged or being discharged through resistors 8, 9, and 11 or triode 14.

When switches 33 and 34 are thrown simultaneously from contacts 35 and 36 to contacts 37 and 38, condenser 41 begins to discharge through resistors 8, 9, and 11. When condenser 41 begins to discharge, the current through resistors 8 and 9 rises immediately to a value as indicated by the side 21 of the flat-topped surge shown in Figure 2. After this current has persisted long enough to decrease the voltage on condenser 13 to a value sufficiently less than that of bias battery 7, triode 14 becomes conducting whereupon condenser 41 is rapidly discharged through resistor 18 and triode 14 producing the side 23 of the surge shown in Figure 2.

The action of the remainder of the circuit is as described for Figure 1.

There are many variations permissible in the design of this invention, both in the detailed arrangement of parts and the selection of circuit constants including, voltage, capacitance, and resistance. The principal characteristics of this invention can be summarized as follows: A condenser is either charged or discharged into a circuit of capacitance and resistance simultaneously charging a second circuit in which the capacitance is small compared with that of the first circuit, and exciting a gaseous triode to complete and suddenly stop the current flow after a predetermined time; and utilizing the phenomena of the current starting and stopping to produce in the small-capacitance circuit two brief pulses of voltage at a predetermined time interval.

The characteristics of my invention are further summarized in the claims.

I claim:

1. In combination a circuit including two condensers and a source of electrical potential connected in series and a manually operated switch arranged to selectively and alternately short-circuit each of said condensers, said circuit being connected in series with first and second resistors and arranged to produce upon operation of said switch a rapid change in the amount of electrical energy stored in the short-circuited condenser, said change causing a flow of electrical energy through said resistors, an electrical discharge device having a plate, a cathode and a control electrode, the plate-cathode circuit of said discharge device being connected in parallel with a circuit including said first resistor, the grid-cathode circuit of said discharge device being connected in series with a source of biasing potential and said second resistor, a second condenser connected between said grid and cathode, whereby said flow of electrical energy will cause an abrupt change of potential across said first resistor and whereby said electrical discharge device will become conductive and substantially short-circuit said first resistor at a predetermined time after the initiation of said energy flow to cause a square potential pulse to appear across said first mentioned resistor.

2. In combination a circuit including a manually operated switch, a first condenser and a source of steady uni-potential electric current for charging said condenser, said circuit being connected in series with first and second resistors, said switch being arranged to produce upon operation of said switch a rapid change in the amount of electrical energy stored in said condenser, said change causing a flow of electrical energy through said resistors, an electrical discharge device having a plate, a cathode, and a control electrode, the plate-cathode circuit of said discharge device being connected in parallel with a circuit including said first resistor, the grid-cathode circuit of said discharge device being connected in series with a source of biasing potential and said second resistor, a second condenser connected between said grid and cathode, whereby said flow of electrical energy will cause an abrupt change of potential across said first resistor and whereby said electrical discharge device will become conductive and substantially short-circuit said first resistor at a predetermined time after the initiation of said energy flow to cause a single square potential pulse to appear across said first mentioned resistor, and a differentiating means having its input connected across a circuit including said first mentioned resistor.

3. The combination of claim 1 in which the electrical discharge device is enclosed in a gaseous atmosphere.

LYMAN R. SPAULDING.

References Cited in the file of this patent

UNITED STATES PATENTS

| Number | Name | Date |
|---|---|---|
| 2,355,363 | Christaldi | Aug. 8, 1944 |
| 2,412,485 | Whitely | Dec. 10, 1946 |
| 2,419,340 | Easton | Apr. 22, 1947 |
| 2,428,926 | Bliss | Oct. 14, 1947 |
| 2,430,154 | Woodward | Nov. 4, 1947 |
| 2,435,958 | Dean | Feb. 17, 1948 |
| 2,441,957 | De Rosa | May 25, 1948 |
| 2,463,969 | Hulst | Mar. 8, 1949 |
| 2,464,393 | Heim | Mar. 15, 1949 |
| 2,554,172 | Custin | May 22, 1951 |
| 2,570,442 | Grosdoff | Oct. 9, 1951 |

FOREIGN PATENTS

| Number | Country | Date |
|---|---|---|
| 491,741 | Great Britain | Sept. 8, 1938 |